United States Patent
Schmidt et al.

(10) Patent No.: US 7,395,854 B2
(45) Date of Patent: Jul. 8, 2008

(54) SYSTEMS AND METHODS FOR CONTROLLING COOLING FLUID TEMPERATURE IN A FUEL CELL ENGINE

(75) Inventors: Gerhard Schmidt, Vancouver (CA); Mark G. Voss, Franksville, WI (US); Frank N. Jarrett, Racine, WI (US)

(73) Assignees: NuCellSys GmbH, Kirchheim/Teck-Nabern (DE); Modine Manufacturing Company, Racine, WI (US)

( * ) Notice: Subject to any disclaimer, the term of this patent is extended or adjusted under 35 U.S.C. 154(b) by 539 days.

(21) Appl. No.: 10/897,532

(22) Filed: Jul. 23, 2004

(65) Prior Publication Data

US 2005/0042484 A1 Feb. 24, 2005

Related U.S. Application Data

(60) Provisional application No. 60/490,362, filed on Jul. 24, 2003.

(51) Int. Cl.
    *B60H 1/00* (2006.01)
(52) U.S. Cl. .................. 165/287; 165/44; 429/12; 429/13; 429/26; 62/244

(58) Field of Classification Search .................. 165/287, 165/42, 43, 44; 429/12, 13, 26; 62/198, 62/244

See application file for complete search history.

(56) References Cited

U.S. PATENT DOCUMENTS

| | | | | |
|---|---|---|---|---|
| 6,569,550 | B2 * | 5/2003 | Khelifa ...................... | 429/13 |
| 6,705,101 | B2 * | 3/2004 | Brotz et al. ................. | 62/198 |
| 6,835,483 | B2 * | 12/2004 | Ballantine et al. ........... | 429/26 |
| 6,865,901 | B2 * | 3/2005 | Horn et al. .................. | 62/244 |
| 6,942,938 | B2 * | 9/2005 | Derflinger et al. ........... | 429/26 |
| 7,052,790 | B2 * | 5/2006 | Nakamura et al. ............ | 429/13 |
| 7,055,337 | B2 * | 6/2006 | Horn et al. .................. | 62/244 |
| 7,063,139 | B2 * | 6/2006 | Horn et al. .................. | 165/42 |
| 7,191,858 | B2 * | 3/2007 | Vanderwees et al. .......... | 429/26 |

* cited by examiner

*Primary Examiner*—Ljiljana (Lil) V Ciric
(74) *Attorney, Agent, or Firm*—Crowell & Moring LLP

(57) ABSTRACT

Systems and methods for a temperature control loop in a vehicular engine compartment to concurrently cool at least two devices with a single fluid supply source when each device requires the cooling supply fluid to have a distinct temperature. The supply fluid, having a first temperature, can be simultaneously routed through a primary heat exchanger and a mixing valve. The primary heat exchanger cools the first temperature fluid to produce a second temperature fluid. The mixing valve controllably receives at least some of the first temperature fluid and some of the second temperature fluid discharged from the primary heat exchanger and mixes the respective fluids to produce a third temperature fluid. The second temperature fluid not diverted to the mixing valve is used to cool a first device located downstream of the primary heat exchanger. The third temperature fluid is used to cool a second device located downstream of the mixing valve.

14 Claims, 2 Drawing Sheets

SYSTEMS AND METHODS FOR CONTROLLING COOLING FLUID TEMPERATURE IN A FUEL CELL ENGINE

BACKGROUND OF THE INVENTION

1. Field of the Invention

The present invention is directed toward systems and methods for controlling cooling fluid temperature within a vehicular engine compartment.

2. Description of the Related Art

A vehicle engine compartment, such as one containing a fuel cell, often contains more than one device using a single cooling fluid supply. Cooling fluid supply lines may be routed through a heat exchanger to cool the fluid, then may be used to cool other components located downstream, such as the fuel cell or a condensing heat exchanger. However, the set point temperature requirement of the fuel cell may be significantly different than the set point temperature requirement of the condensing heat exchanger or other devices. The set point temperature is the temperature specified by the manufacturer that will permit the given device to operate optimally and efficiently.

A common solution for cooling multiple components with only one heat exchanger has been to accept the fact that one or both of the downstream components will receive cooled system fluid that is not on par with the component's set point temperature. For example, if a fuel cell has a set point temperature requirement of 200° F., but the condensing heat exchanger has a set point temperature of only 100° F., then all of the system fluid is commonly cooled to the lower temperature to prevent the condensing heat exchanger from overheating or operating inefficiently. The cooling fluid may then be routed to the fuel cell at an undesired temperature, or may need to be heated before it is routed to the fuel cell, each of which is an inefficient use of cooling fluid resources. This solution is doubly ineffective because the primary heat exchanger must have a high operational capacity to process all of the cooling fluid. Further, there are significant energy losses caused by processing all of the system fluid through the primary heat exchanger because all of the fluid does not need to be cooled to the lowest set point temperature. These energy losses are not recoverable.

Another solution to the above problem is to provide a secondary heat exchanger. Using the above mentioned example of a fuel cell having a set point temperature higher than the set point temperature of a condensing heat exchanger, the primary heat exchanger could be configured to provide cooling fluid to the fuel cell at the higher temperature. The cooling fluid could then be further cooled by the secondary heat exchanger before it is routed to the condensing heat exchanger. However, the added costs of a secondary heat exchanger make this option undesirable.

Another solution to the above problem has been to use a customized heat exchanger. Using a customized heat exchanger greatly increases the initial assembly cost and the long-term maintenance cost. Customized heat exchangers are much more expensive than standard, so-called "off-the-shelf" heat exchangers, require more maintenance and in the event of component failure, and are extremely difficult to replace.

Another solution is to merely provide independent supply lines or cooling loops. However, the added expense, spatial and weight requirements, and increased complexity make this option undesirable.

Accordingly, there is a need in the industry for an efficient, streamlined, and cost effective cooling system that can adequately control two or more temperatures.

BRIEF SUMMARY OF THE INVENTION

The present invention is directed toward systems and methods for controlling the cooling fluid temperature within a vehicular engine compartment wherein a single heat exchanger and a mixing valve operate together to produce two independent streams of coolant supply fluid, each having a controllable temperature. Embodiments of the present invention allow cooling fluid to be distributed at the desired temperature to multiple components that require cooling supply fluid at a different temperature. Thus, the system allows such devices to be efficiently and economically integrated into a single temperature control loop.

In one embodiment of the present invention a stream of the first temperature fluid is split between a primary heat exchanger and a mixing valve. The primary heat exchanger reduces the temperature of the first temperature fluid to a second temperature. A portion of the second temperature fluid then is routed to a first device, downstream from the primary heat exchanger, for cooling thereof. The remaining second temperature fluid is diverted to the mixing valve. The mixing valve controllably and proportionally mixes the first and second temperature fluids to produce a third temperature fluid, which can be routed to a second device, located downstream of the mixing valve, for cooling thereof. The actual temperatures of the streams directed to the first and second devices are controllable and determined by the devices' set point temperatures.

Another embodiment of the present invention is directed toward a temperature control system, such as that above, having a recycling line being in fluid communication with the first and second devices and with the primary heat exchanger. In such an embodiment, the system forms a continuous control loop.

The present invention is also directed toward methods of providing several streams of cooling fluid to several devices having distinct set point temperatures, but by using only a single heat exchanger or smaller heat exchangers than traditionally required.

DETAILED DESCRIPTION OF THE INVENTION

The present detailed description is generally directed toward systems and methods for minimizing the component costs, complexity, and energy losses associated with a single loop vehicular cooling system. Embodiments of the present invention can employ a single, standard heat exchanger to achieve two different and controllable downstream fluid temperatures. Specific details of certain embodiments of the invention are set forth in the following description and illustrated in FIGS. 1-2 to provide a thorough understanding of the illustrated embodiments. One skilled in the art, however, will understand that the present invention may have additional embodiments, and may be practiced without several of the details described in the following description and illustrated in the figures.

Figure 1:
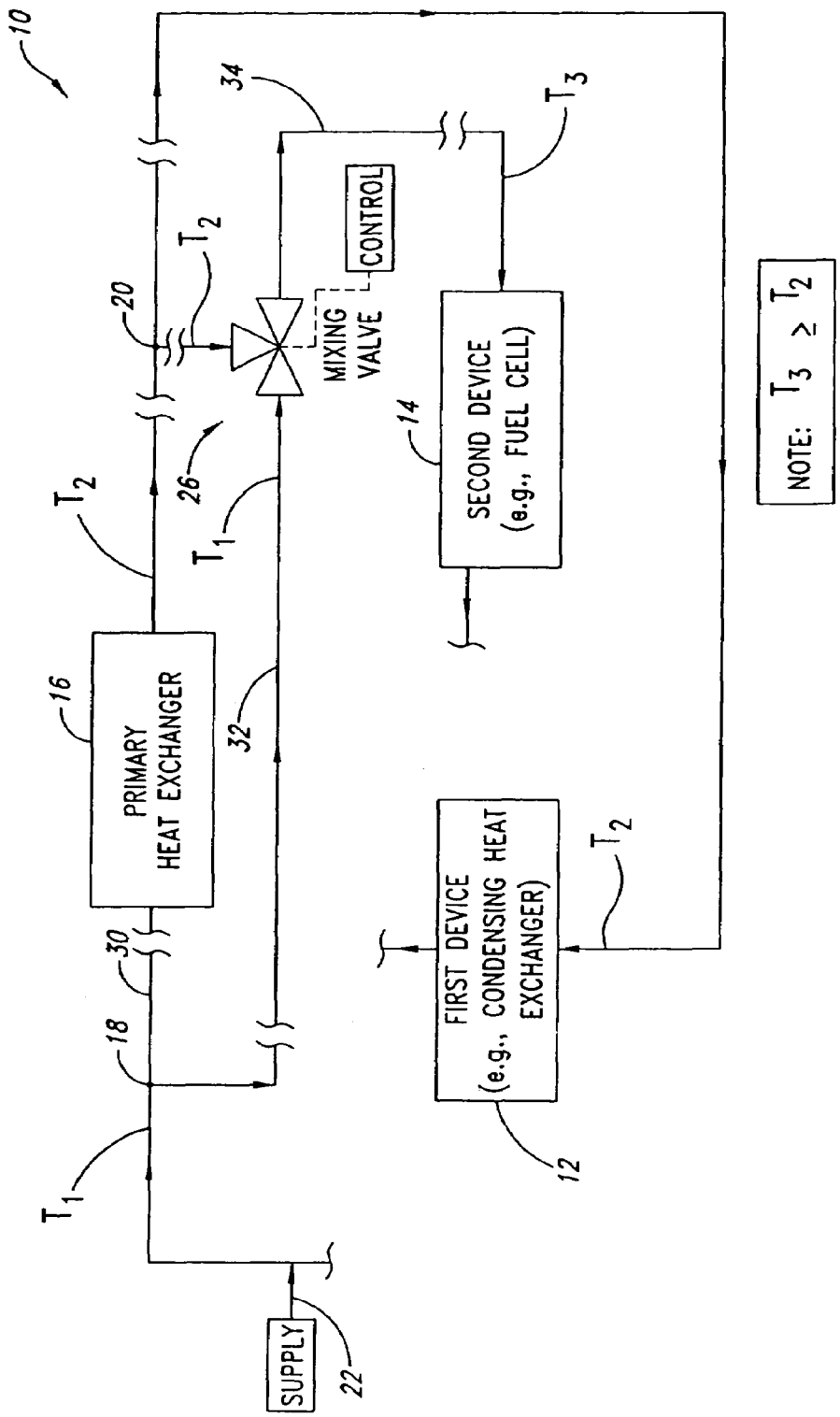
FIG. 1 is a schematic view of a temperature control system according to one embodiment of the present invention.

FIG. 1 schematically illustrates a single loop temperature control system 10 for processing and manipulating the temperature of the cooling fluid therein. In the illustrated system, a first device 12—illustrated as a condenser for example—is designed to receive cooling fluid at a low temperature (T2) and a second device 14—illustrated as a fuel cell for example—is designed to receive cooling fluid at a temperature greater than the low temperature, i.e., at an elevated temperature (T3). The illustrated system uses a primary heat exchanger 16. In general, the primary heat exchanger 16 is configured to output cooling liquid at the low temperature T2, and the cooling fluid streams from the input and output sides of the primary heat exchanger are mixed in a ratio controlled to produce cooling fluid at the elevated temperature T3.

The inventive configuration to reduce the temperature of the cooling fluid recycled from the cooling loop, where the cooling fluid may return at and/or be pre-heated to a high temperature (T1) produces an efficient, low maintenance, and cost effective single loop temperature control system 10 for cooling multiple downstream components with different set point temperatures. The component set point temperature is typically specified by the component manufacturer as the preferred operational temperature of the device. The inventor appreciates that there may be more than two downstream components and the components may be devices other than a fuel cell or a condensing heat exchanger.

The primary heat exchanger 16 provides the primary cooling means for the system 10. The primary heat exchanger 16 may be a standard, "off-the-shelf" heat exchanger. The heat extraction procedure used to cool the incoming cooling fluid may be accomplished by standard methods. For instance, one such method is convection control, using fans, moving air and/or ambient air to cool the passing cooling fluid. The speed of the fans or air (or the vehicle), the number of heat convecting fins, and the ambient temperature of the engine compartment and the surrounding air are some of the factors that are used to determine the size and capacity of the heat exchanger. One of ordinary skill in the art, after reviewing this disclosure, will appreciate the modifications that can be made to the heat exchanger without deviating from the spirit of the invention.

Another standard cooling method is by a liquid-liquid heat transfer where another coolant may be used to extract heat from the cooling fluid. The inventor appreciates that there are still other methods of cooling other than those specified herein and that any cost effective heat exchanger, regardless of cooling method, may be satisfactory for applicant's temperature control system 10. Likewise, the inventor also appreciates that even though the cost may increase, the primary heat exchanger 16 of the temperature control system 10 may be custom designed.

The first device 12 may be a condenser that extracts water from one of the fuel cell exhaust streams.

The second device 14 may be a fuel cell wherein a fuel and an oxidant are electrochemically converted at the cell electrodes to produce electrical power. For the sake of clarity, the fuel cell inlet and exhaust streams, as well as the condenser's inlet and exhaust streams, are not represented in FIG. 1.

The electrochemical reactions occurring within a fuel cell produce heat and require cooling. Cooling spaces or layers may be provided between some or all of the adjacent pairs of cell separator plates to allow the cooling fluid to flow therebetween. In the illustrated embodiment, the fuel cell has a higher set point temperature than the condenser.

Further illustrated in FIG. 1 are tees, 18 and 20, also referred to as first and second diverter means. The tees 18, 20 permit a single source of input fluid from a supply line 22 to be separated into two separate flow paths within the temperature control system 10. For example, tee 18 may be located upstream of the primary heat exchanger 16. Tee 18 can receive the cooling fluid from the supply line 22 and route some of the fluid to the primary heat exchanger 16 and some or all of the remaining fluid to a mixing valve 26. Likewise, tee 20 can be located downstream of the primary heat exchanger 16 such that the discharge fluid from the heat exchanger can be similarly separated into two streams. Tee 20 can allow some of the primary heat exchanger discharge fluid to flow through to the first device 12, which has the lowest set point temperature, and some or all of the remaining heat exchanger discharge fluid to flow to the mixing valve 26.

The mixing valve 26 operates as the means for controllably mixing the high temperature fluid T1 and the low temperature fluid T2 therein. The mixing valve 26 can be in fluid communication with both the primary heat exchanger 16 and the supply line 22. The inventor appreciates that the mixing valve 26 could be located either upstream or downstream of the primary heat exchanger 16, and that one of ordinary skill in the art, having reviewed this disclosure, will appreciate the modifications required to effect such a configuration without deviating from the spirit of the invention.

The overall operation of the system 10 along with the detailed description of the system fluid temperatures throughout the system is best explained by following the flow of the system fluid through the various components. The system fluid temperature phases are as follows:

| Fluid Temp. | Supplying Component(s) | Receiving Component(s) |
|---|---|---|
| T1 | Main Supply Line 22 | First Separator Tee 18 |
| T1 | First Tee 18 | Primary Heat Exchanger 16 and One Side of Mixing Valve 26 |
| T2 | Primary Heat Exchanger 16 | Second Tee 20 |
| T2 | Second Tee 20 | First Device 12 and Other Side of Mixing Valve 26 |
| T3 | Mixing Valve 26 | Second Device 14 |

The temperature control system 10 permits the operator to utilize cooling fluid at three distinct and controllable temperatures during circulation through the system, using only a single heat exchanger. Referring to FIG. 1, the system can start with the supply line 22, which introduces the cooling fluid having a first, high temperature T1. The supply line 22 is in direct fluid communication with the tee 18, the primary heat exchanger 16 and the mixing valve 26. The tee 18 permits at least some of the high temperature fluid T1 to flow to the primary heat exchanger 16 along a secondary supply line 30 and the remaining high temperature fluid is diverted into a first mixing valve supply line 32.

The high temperature fluid T1 arriving from the secondary supply line 30 is received and cooled within the primary heat exchanger 16. After cooling, the fluid discharged from the primary heat exchanger 16 will have the second, low temperature T2, such that T2<T1.

Downstream from the primary heat exchanger 16 can be a second tee 20, which allows at least some of the low temperature fluid T2 to proceed to the first device 12 while diverting the remaining low temperature fluid to the mixing valve 26. The low temperature T2 corresponds to the set point temperature of the first device 12.

The mixing valve 26 may be controllably programmed to proportionally mix the incoming first and second temperature fluids, T1 and T2, to achieve a desired third temperature fluid T3. The third temperature T3 can correspond to the set point temperature of the second device 14.

The amount of high temperature fluid T1 diverted to the mixing valve 26 and the amount of low temperature fluid T2 diverted thereto can be controlled by monitoring the temperature at the outlet 34 of the mixing valve 26.

The cooling fluid discharged from the mixing valve output 34 having the elevated fluid temperature T3 can be transported to the second device 14, such as the fuel cell, for cooling thereof. As the elevated temperature T3 fluid moves through the fuel cell 14, the fluid absorbs heat from the fuel cell.

Similarly, the low temperature fluid T2 discharged from the primary heat exchanger 16 but not diverted to the mixing valve 26 can be transported to the first device 12, such as the condensing heat exchanger, for cooling thereof. As the low temperature fluid T2 moves through the condensing heat exchanger 12, the fluid absorbs heat. The inventor appreciates that the fluid temperatures described herein, not only their absolute values but also their relative and comparative values, are illustrative and can be varied to be suitable for different devices and configurations.

The illustrated embodiment has several advantages over the prior art. For example, because the embodiment can use only a single heat exchanger, the system can avoid the cost, weight and complexity of two or more heat exchanger, and can reduce space requirements, which is highly beneficial in vehicular applications. Further, the invention provides for intermediate temperature fluid with not only a single heat exchanger, but also without requiring a secondary heat source, which can also reduce cost, weight, complexity and space requirements.

Figure 2:
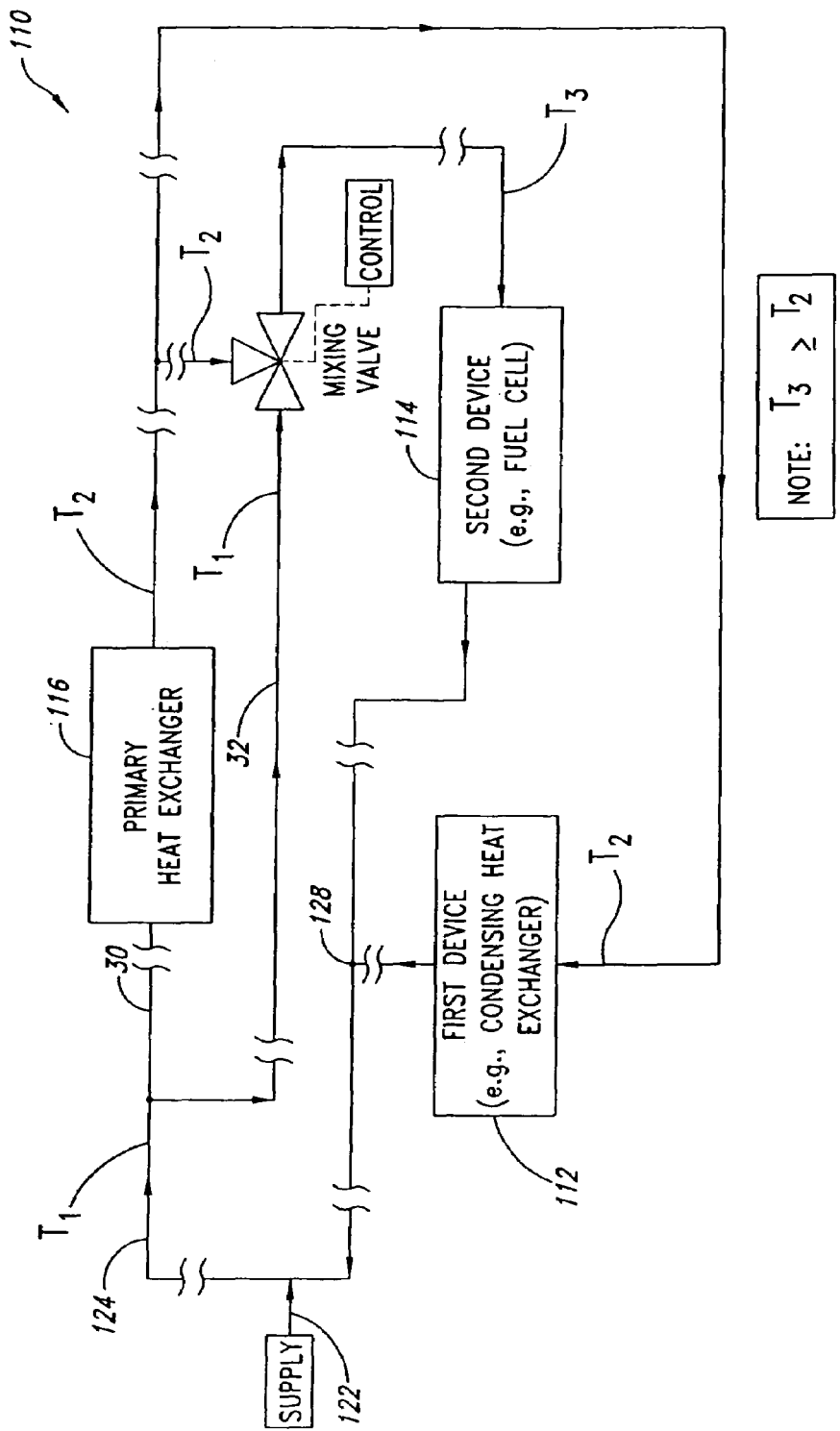
FIG. 2 is a schematic view of a temperature control system according to another embodiment of the present invention.

FIG. 2 schematically illustrates another cooling system 110 in which a recycling line 124 is in fluid communication with the first device 112, the second device 114 and the primary heat exchanger 116, such that the system forms a continuous loop. In this embodiment, a tee 128 can be located downstream of the first and second devices 112, 114. The tee 128 can receive the cooling fluid output from the devices, and combine them into a single stream that can be re-used by the system 110. The supply line 122 can be used to add cooling fluid to the system as necessary or desired.

One of ordinary skill in the art, having reviewed this disclosure, will appreciate the components and requirements necessary for producing a low cost, high efficiency temperature cooling system. In addition, one of ordinary skill in the art, after reviewing the present disclosure, will appreciate that there are other equivalent configurations for developing the temperature control system by merely relocating certain components, including additional mixing valves, or even including an additional fuel cell or condensing heat exchanger, for example.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A temperature control system for a vehicular cooling fluid system, the system comprising:
    a primary heat exchanger configured to receive cooling fluid from a supply source at a first temperature, the primary heat exchanger further configured to output the cooling fluid as an output stream at a second temperature to a first device, the second temperature fluid being cooler than the first temperature fluid; and
    a mixing valve in fluid communication with the supply source to receive cooling fluid therefrom at the first temperature, and in fluid communication with the output stream to receive cooling fluid therefrom at the second temperature, the mixing valve being controllable to mix the first and second temperature fluids to output a stream of fluid at a third temperature to a second device, the third temperature fluid being less than or equal to the first temperature fluid temperature and greater than or equal to the second temperature fluid.

2. The temperature control system of claim 1, further comprising a recycling line in fluid communication with the first and the second devices and with the primary heat exchanger.

3. The temperature control system of claim 1 wherein the first device comprises a condensing heat exchanger.

4. The temperature control system of claim 1 wherein the second device comprises a fuel cell.

5. A temperature control system for a vehicular cooling fluid system, the system comprising:
    a supply line configured to carry system cooling fluid at a first temperature;
    a primary heat exchanger in fluid communication with the supply line, the primary heat exchanger configured to receive at least some of the cooling fluid at the first temperature and to discharge cooling fluid at a second temperature that is lower than the first temperature;
    a first device in fluid communication with the primary heat exchanger and configured to receive at least some of the cooling fluid which is at said second temperature;
    a mixing valve having at least two input ports and at least one output port, a first input port being in fluid communication with the heat exchanger to controllably receive therefrom at least some of the cooling fluid which is at said second temperature, a second input port being in fluid communication with the supply line to controllably receive therefrom at least some of the cooling fluid which is at said first temperature, the mixing valve being controllable to mix the cooling fluids which are at said first and second temperatures, to output cooling fluid at a third temperature that is higher than the second temperature and lower than the first temperature; and
    a second device located downstream from the mixing valve for receiving the cooling fluid which is at said third temperature from the mixing valve.

6. The temperature control system of claim 5, further comprising a recycling line in fluid communication with the discharge ends of the first and the second devices and with the primary heat exchanger.

7. The temperature control system of claim 5 wherein the first device comprises a condensing heat exchanger.

8. The temperature control system of claim 5 wherein the second device comprises a fuel cell.

9. Temperature control apparatus for a vehicular cooling fluid system, the temperature control means comprising:
    a supply means for introducing cooling fluid at a first temperature;
    a primary cooling means for receiving the cooling fluid therein at the first temperature and discharging the cooling fluid at a second temperature for use by a first device;
    a first diverter means for diverting at least some of the first temperature fluid from the supply means;
    a second diverter means for diverting at least some of the second temperature fluid from the discharge of the primary cooling means; and
    a mixing means for controllably mixing the first temperature fluid received from the first diverter means and the second temperature fluid received from the second diverter means to produce cooling fluid at a third temperature for use by a second device, the third temperature fluid being of a temperature higher than the second temperature and lower than the first temperature.

10. The temperature control apparatus of claim 9 wherein the primary cooling means is in fluid communication with the first device.

11. The temperature control apparatus of claim 9 wherein the mixing means is in fluid communication with the supply means, the primary cooling means, and the second device.

12. The temperature control apparatus of claim 9, further comprising the supply means being in fluid communication with the first device and the second device for receiving fluid discharge therefrom.

13. A temperature control method for a vehicular cooling fluid system, the method comprising:

supplying a first portion of a cooling fluid having a first temperature from a supply line to a primary heat exchanger and diverting a second portion of the first temperature fluid to a mixing valve;

cooling the first portion of the fluid to a second temperature within the primary heat exchanger;

supplying a first portion of the second temperature fluid to a first device and diverting a second portion of the second temperature fluid to a mixing valve;

controllably mixing second portions of the first and second temperature fluids within the mixing valve to produce a third temperature fluid, the third temperature fluid being of a higher temperature than the second temperature fluid and of a lower temperature than the first temperature fluid; and supplying the third temperature fluid to a second device.

14. The method of claim 13, further comprising integrating the fluid discharged from the first and second devices back into the supply line.

* * * * *